United States Patent [19]

Imai et al.

[11] 4,059,555

[45] Nov. 22, 1977

[54] NOVEL AQUEOUS ADHESIVE

[75] Inventors: Hirosuke Imai; Hiroyuki Ito, both of Yokohama, Japan

[73] Assignee: Nippon Oil Company Ltd., Tokyo, Japan

[21] Appl. No.: 645,751

[22] Filed: Dec. 31, 1975

Related U.S. Application Data

[63] Continuation of Ser. No. 442,769, Feb. 15, 1974, abandoned.

[30] Foreign Application Priority Data

Feb. 19, 1973 Japan .................................. 48-19179

[51] Int. Cl.$^2$ ............................................... C08L 9/00
[52] U.S. Cl. ........................ 260/29.7 H; 260/29.7 AT
[58] Field of Search ................... 260/29.7 H, 29.7 AT; 526/15, 47, 272

[56] References Cited

U.S. PATENT DOCUMENTS 2,286,062   6/1942   Condo et al. ........................... 526/47
3,491,068   1/1970   Gaylord ................................ 526/272

OTHER PUBLICATIONS

Skeist, Handbook of Adhesives, Van Nostrand Reinhold, 1962, pp. 256–267.
Blackley, High Polymer Latices, 2, 1966, Applied Science Publ., pp. 747–749.
Yeats, Electropainting, Draper Ltd., 1970, pp. 78–85.

*Primary Examiner*—M. J. Welsh
*Attorney, Agent, or Firm*—Frank J. Jordan

[57] ABSTRACT

A water-soluble adhesive comprising a partly alkali metal-modified butadiene-maleic anhydride copolymer wherein the free carboxylic acid groups and the carboxylic acid-alkali metal salt groups are contained in ratios of from 9 : 1 to 2.5 : 7.5; and a process for preparing same.

6 Claims, No Drawings

NOVEL AQUEOUS ADHESIVE

This is a continuation, of application Ser. No. 442,769, filed Feb. 15,1974, and now abandond.

This invention relates to a novel water-soluble adhesive having satisfactory adhesiveness particularly for polar substances and to a process for preparing same. More particularly it relates to such an adhesive comprising a partly alkali metal-modified butadiene-maleic anhydride copolymer wherein the carboxylic acid groups and the carboxylic acid-alkali metal salt groups are contained in ratios of from 9 : 1 to 2.5 : 7.5, and to a process for preparing same.

In general, water-soluble adhesive or binders are advantageous in that there is no danger of causing fire due to ignition of the volatile solvent contained therein and are quite harmless to human bodies and therefore safe when in use since they contain water as the solvent; they are further advantageous in that they are superior in oil and solvent resistances. In addition, they find particular uses as re-wettable adhesives and the like. On the other hand, they are disadvantageous in that they have poor water resistance and dry slowly; however they are in increasing demand since their use as adhesives is recommendable from the view point of environmental sanitation and environmental pollution prevention. The water-soluble adhesives include natural and synthetic ones. The natural adhesives such as starch and glue, which have long been used, are susceptible to quality and performance problems in that they are subject to putrefaction, qualitative deterioration and the like and have low adhesive strength and the like. On the other hand, the synthetic aqueous adhesives include polyvinyl alcohol, polyacrylamide and copolymers thereof, polyvinyl methyl ether and copolymers thereof with maleic anhydride and polyvinylpyrrolidone, which, with the exception of polyvinyl alcohol are not now used much mainly because of their higher price. Polyvinyl alcohol, however, is mainly used as an adhesive for paper, but is not used much for materials other than paper, part of the reason for this being that polyvinyl alcohol will not exhibit satisfactory bond strength when used as an adhesive for materials other than paper. Attempts have thus been made by the present inventors to find high molecular weight compounds which are soluble in a suitable solvent such as water and have a satisfactory bond strength that is not inferior to that of so-called solvent type adhesives in which an organic solvent is used, with the result that the present compounds, prepared by reacting part of a copolymer of butadiene and maleic anhydride with at least one alkali metal compound in solution, have proved satisfactory to the purpose of this invention.

A primary object of this invention is to provide a novel water-soluble adhesive having high bond strength and satisfactory adhesiveness particularly for polar substances. This is achieved by hydrolyzing a butadiene-maleic anhydride copolymer and then partly reacting the hydrolyzed copolymer with at least one alkali metal compound in a liquid phase such as an aqueous phase to obtain the novel water-soluble adhesive comprising substantially a partly alkali metal-modified butadiene-maleic anhydride copolymer (hereinafter referred to as "partly alkali metal-modified copolymer" for simplicity) wherein the number of the free carboxylic acid groups and that of the carboxylic acid-alkali metal salt groups are present in ratios of from 9 : 1 to 2.5 : 7.5. The solvents used herein may be any of those conventionally used with water being preferred.

The partly alkali metal-modified compounds according to this invention are usually represented by the following formula

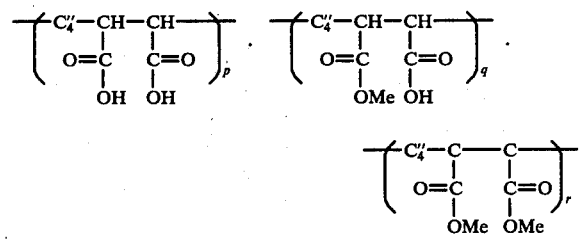

wherein $$-C_4''-$$

indicates a butadiene unit of the copolymer, Me indicates an alkali metal selected from the group consisting of Li, Na and K, and p, q and r are each an integer. More particularly, the main chain of the copolymer is composed of butadiene and maleic anhydride polymerization units. The maleic anhydride units are hydrolyzed and reacted with an alkali metal to substantially form a mixture of units wherein the two carboxylic acid groups of the dicarboxylic acid groups are free acids, those wherein one of the two caboxylic acid groups is a free acid and the other is converted to a carboxylic acid-alkali metal salt group and those wherein the two carboxylic acid groups are converted to carboxylic acid-alkali metal salt groups. The ratios of from 9 : 1 to 2.5 : 7.5 between the free carboxylic acid groups and the carboxylic acid-alkali metal salt groups according to this invention indicate that the ratios of $(2p+q) : (2r+q)$ expressed in said formula are in the range of from 9 : 1 to 2.5 : 7.5. The expression "$(2p+q)$" indicates the amount of the free carboxylic acid groups in the molecule and the expression "$(2r+q)$" the amount of the caboxylic acid-alkali metal salt groups.

The process for the preparation of the novel water-soluble adhesives of this invention will be detailed below.

A solution of a butadiene-maleic anhydride copolymer is mixed with a solution, preferably an aqueous solution of a predetermined amount of an alkali metal compound to form a mixed solution which is blended and heated under agitation for a predetermined time. Thus, the acid anhydride units in the copolymer are reacted with the alkali metal compound to effect the ring breakage of the anhydride units thereby producing an aqueous solution of a copolymer wherein part of the carboxylic acid groups are free acids and the remainder thereof are converted to carboxylic acid-alkali metal salt groups. Solutions of the partly alkali metal-modified copolymer will exhibit satisfactory properties as the desired aqueous adhesive only when the ratios of the number of the free carboxylic acid groups to that of the carboxylic acid-alkali metal salt groups in the copolymer are in the suitable ranges as previously mentioned. The alkali metal-modified copolymer solutions so produced may be used, as they are, as the water-soluble adhesive and may also be used in a concentrated or diluted form if desired.

The original or starting butadiene-maleic anhydride copolymers which may be used in this invention are prepared by known processes. Examples of the starting copolymers are those synthesized from butadiene and maleic anhydride in the presence of a radical-producing catalyst, those synthesized by the application of ultraviolet rays or ionizing radiation to the monomers or those polymerized therefrom in the presence of an organic metal catalyst. These starting copolymers are usually those wherein the butadiene and maleic anhydride units are arranged alternately with one another. Preferable starting butadiene-maleic anhydride copolymers which may be used in this invention are those having an intrinsic viscosity of 0.1–3.0 and preferably 0.2–2.0 as determined in acetone 30° C. The use of butadiene-maleic anhydride copolymers having an intrinsic viscosity of less than 0.1 as determined in acetone at 30° C will not give a partly alkali metal-modified copolymer the solution of which exhibits satisfactorily high bond strength when used as an adhesive since they have an unduly low molecular weight. In addition, the use of starting copolymers having an intrinsic viscosity of more than 3.0 will give a partly alkali metal-modified copolymer the aqueous solution of which has a too high viscosity thereby rendering the handling thereof inconvenient. Thus, such highly viscous adhesives are not desirable.

The alkali metal compounds which may be used in this invention are basic alkali metal compounds including hydroxides such as sodium, potassium and lithium hydroxides; carbonates such as sodium, potassium and lithium carbonates; and bicarbonates such as sodium and potassium bicarbonates. These compounds may also be used in mixture. In the preparation of the water-soluble adhesives of this invention, the amount of the alkali metal compound to be used for reaction with the starting copolymer should suitably be such as to correspond to 0.2–1.5 equivalent of the maleic anhydride residue in the starting copolymer. Since this reaction proceeds stoichiometrically, there can easily be obtained the desired partly alkali metal-modified copolymers in which the ratio of the free carboxylic acid groups to the carboxylic acid-alkali metal salt groups is in the range of from 9 :1 to 2.5 : 7.5. Those in which this ratio is outside of said range will exhibit unsatisfactory properties as a water-soluble adhesive whereby the object of this invention cannot be attained. The modified copolymers having a free acid/acid-alkali metal salt ratio of more than 9 : 1 are too low in water solubility and can therefore not be dissolved in water in amounts sufficient to allow the resulting solution to be used as a water-soluble adhesive for purposes of this invention. If, for example, the starting copolymers with which the alkali metal compound is not yet reacted are attempted to be dissovled in water, their solubility (the amount thereof dissolved) will amount, at the maximum, to only about 2% by weight thereof even if the water is heated for many hours. If in this case such a compound as sodium hydroxide is added in small amounts to the water, the copolymer will gradually increase in solubility. However, in order to obtain a partly alkali metal-modified copolymer which is water-soluble sufficient to enable the resulting aqueous solution to be used as the aqueous adhesive, a starting copolymer for said modified copolymer is required to be reacted with at least 0.2 equivalent of the alkali metal compound so that the resulting alkali metal-modified copolymer has a free acid/acid-alkali: metal salt copolymer has a ratio of less than 9/1. In a modified compolymer having a free acid-/acid-alkali: metal salt ratio of less than 2.5/7.5, 75%–100% of the total of the carboxylic acid groups are carboxylic acid-alkali metal salt groups whereby the modified copolymer when dissolved in water will have too high a polarity with the result that the consequent solution has a remarkably decreased adhesiveness. In addition, this solution will unusually increase in viscosity due to the repulsion of the electric charge of the high molecular chain of the modified copolymer dissolved in the solution, this making the solution very disadvantageous in respect of its industrial use.

If the use of still further alkali metal compound is made in the preparation of a modified copolymer, the resulting copolymer when dissolved in water will allow the unreacted alkali metal compound to remain in the solution thereby causing various troubles. As mentioned above, the modified copolymer which may be used in the water-soluble adhesive of this invention is required to have a free acid/acid-alkali: metal salt ratio in the range of from 9 : 1 to 2.5 : 7.5. Since the water-soluble adhesives to be obtained somewhat vary in properties depending upon the particular ratio in the modified copolymer contained therein even if the ratio is within said range, the ratio should be selected so that the modified copolymer is best adapted for the adhesives according to their use.

In the preparation of the water-soluble adhesives of this invention the reaction temperature used is in the range of from 20° to 100° C and is usually the same as the boiling point of the water. The starting copolymer will react with the alkali metal compound in water and dissolve therein even at room temperature if the reaction time used is sufficient; however, this procedure is not an efficient one. The reaction time varies with the temperature used and is usually between 0.5 and 5 hours, preferably between 1 and 3 hours. The reaction is desirable to effect in an atmosphere of an inert gas such as nitrogen and it may nevertheless be effected in air without decreasing the effects or advantages otherwise obtainable by the practice of this invention. Those starting copolymers containing a stabilizing agent such as β-naphthylamine, may be used as the starting copolymer in the invention.

According to this invention, the thus-obtained aqueous solutions of the partly alkali metal-modified copolymer may be used, as they are, as the aqueous adhesive of this invention. Alternatively, they may be treated so as to separate therefrom the modified copolymer which is then purified and dried for its subsequent use as the aqueous adhesive by dissolving it in water. Thus, they may be used in any one of these ways according to the purpose for which they are used. In addition, they may be incorporated with any other water-soluble resins and/or natural adhesive materials such as starch.

The modified copolymer in aqueous solution according to this invention has a great adhesiveness as compared with Poval (polyvinyl alcohol) in aqueous solution which is now mainly used as a synthetic water-soluble binder or adhesive. Moreover, if desired, the modified copolymer may be three-dimensionally crosslinked owing to the ethylenic unsaturation of the butadiene residues in the main polymer chain of the copolymer, or may further be cured owing to the carboxylic acid groups contained therein. Thus, the modified copolymer has these and other features in which Poval is lacking.

The aqueous adhesive of this invention will further be explained by reference to the following examples.

EXAMPLE 1

To a 300-ml separable flask provided with a reflux condenser, previously purged with nitrogen, were added 10 g of a butadiene-maleic anhydride copolymer (hereinafter referred to as "BMP") having a composition ratio of 52 : 48 between the butadiene units and maleic anhydride units (this copolymer being composed of the units derived from butadiene and those derived from maleic anhydride in the ratio of 52 : 48) and having an intrinsic viscosity of 0.92 as determined in acetone at 30° C, 0.53 g of sodium hydroxide and 90 g of water to form a mixture which was then heated to the temperature at which water boils under agitation for two hours, thereby obtaining a colorless, transparent and viscous liquid in aqueous solution. A partly sodium-modified butadiene-maleic anhydride copolymer (hereinafter referred to as "BMPS") prepared by purifying and drying a portion of the thus-obtained aqueous solution was tested by a suitable titration method for its free acid/acid-alkali: metal salt ratio between the free carboxylic acid groups and the carboxylic acid-sodium salt groups contained therein, with such ratio being found to be approximately 90 : 10. The remaining aqueous solution was coated with No. 10 canvases each of 300 × 150 mm in size to cover their surface portion of 230 × 150 mm therewith in the amount of 0.05 g/cm² and then dried for two hours. This procedure was repeated twice and two of the canvases so coated were overlapped, i.e., placed in an overlapping position with the coated surfaces facing each other and then pressure bonded under a pressure of 5 Kg/cm² exerted thereon for one minute by the use of an oil pressure press. The overlapped canvases so pressure bonded were cut into test pieces of 25 mm in width which were placed in a chamber kept at 24° C and a relative humidity of 50% for 7 days. The tests pieces so prepared were subjected to a T type peel test at 24° C and at a velocity of 250 mm/min. The test was repeated ten times and the results obtained from the test were averaged and indicated in Table 1.

EXAMPLES 2-5, COMPARATIVE EXAMPLES 1-2

In the same manner as in Example 1, each BMPS aqueous solution was prepared from 10 g of the same BMP as used in Example 1, 90 g of water, and sodium hydroxide in such amount that the resulting BMPS had the free acid/acid-alkali: metal salt ratio indicated in Table 1. Each solution so prepared was then coated on No. 10 canvases and the thus-coated canvases to be treated were subjected to a T type peel test in the same manner as in Example 1. The test was repeated ten times and the results averaged were shown in Table 1.

COMPARATIVE EXAMPLE 3

Using a viscous aqueous solution prepared by dissolving in 90 g of water, 10 g of a commercially available powdered polyvinyl alcohol having a polymerization degree of 1800 and saponification degree of 88%, the same procedure as used in Example 1 was followed. The results are indicated in Table 1, from which it is seen that the adhesive of Comparative example 3 exhibited a bond strength corresponding to ⅓ to ½ of that of the adhesive of this invention.

Table 1

|  | Carboxylic acid groups in BMPS (%) | Carboxylic acid-sodium salt groups in BMPS (%) | Peel strength Kg/25 mm |
|---|---|---|---|
| Example 1 | 90 | 10 | 5.0 |
| Example 2 | 87.5 | 12.5 | 6.2 |
| Example 3 | 75 | 25 | 7.3 |
| Example 4 | 50 | 50 | 6.8 |
| Example 5 | 25 | 75 | 4.1 |
| Comparative |  |  |  |
| Example 1 | 10 | 90 | 2.0 |
| Example 2 | 0 | 100 | 0.3 |
| Example 3 | — | — | 2.8 |

COMPARATIVE EXAMPLE 4

In the same manner as in Example 1, a mixture of 10 g of the same BMP as used in Example 1 and 90 g of water without the addition of the alkali metal compound thereto was heated for 12 hours with the result that only 2% by weight of the polymer used was dissolved. The mixture was then incorporated with 0.4 g of sodium hydroxide and further heated for another 10 hours with the result that a concentration of the BMP dissolved in the mixture amounted to about 5%. The mixture was freed of the undissolved portion of the BMP to obtain the aqueous solution only. The solution so obtained was dried and tested for the free acid/acid-alkali: metal salt ratio of the BMPS obtained. The ratio was found to be 93 : 7. In each case, however, the aqueous solution portion of the mixture was insufficient in concentration as an adhesive.

EXAMPLE 6

In the same manner as in Example 1, there was prepared an aqueous solution of a BMPS having a free acid/acid-alkali: metal salt ratio of 75 : 25 from 10 g of a BMP containing the butadiene units and maleic anhydride units in a ratio of 54 : 46 and having an intrinsic viscosity of 1.20 as determined in acetone at 30° C, 1.8 g of potassium hydroxide and 90 g of water. The aqueous solution so obtained was coated on birch boards each of 30 × 25 × 10 mm so as to cover their surface portion of 25 × 25 mm with the solution in the amount of 0.05 g/cm² and then dried for two hours. This coating and drying procedure was repeated twice. Two of the thus-coated boards were placed in overlapping position with the coated surfaces facing each other and were then pressure bonded together by applying a pressure of 10 Kg/cm² thereto for one minute by the use of an oil pressure press. The test pieces thus prepared were placed in a chamber kept at 24° C and a relative humidity of 50% for 7 days. Five of the test pieces so treated were subjected to a compression shearing test resulting in all the pieces being perfectly ruptured. For comparison, the same test as above was made using test pieces in which the aqueous Poval solution prepared in Comparative example 3 was employed as the adhesive. The result was that the latter adhesive caused a rupture partly in the wood bodies themselves and partly at the interface therebetween.

EXAMPLE 7

Films of 0.1 mm in thickness were dry-formed out of the aqueous solution synthesized in Example 4. One of the films so formed was sandwiched in between two steel plates and the three were pressure bonded together by applying a pressure of 10 Kg/cm² thereto at 150° C for 10 minutes by using an oil pressure heat press. This test piece thus treated was cooled to room temperature and then tested for shearing strength while pulling it at a loading rate of 300 Kg/min. The shearing strength was thus found to be 154 Kg/cm².

EXAMPLE 8

One of the films formed in Example 7 was sandwiched in between two glass plates and the three were satisfactorily pressure bonded together by exerting a pressure of 5 Kg/cm² thereon at 150° C for 10 minutes. Thus the film exhibited satisfactory adhesiveness and the interfacial adhesive layer was transparent.

EXAMPLE 9

In the same manner as in Example 1, an aqueous solution of a BMPS containing the free carboxylic acid groups and the carboxylic acid-sodium salt groups in the ratio of 50 : 50 was prepared from 10 g of a BMP consisting of the butadiene units and the maleic anhydride units in the ratio of 51 : 49, 7.0 g of anhydrous sodium bicarbonate and 120 g of water. The solution so prepared was coated on paper, which had not been surface treated, in the amount of 0.05 g/cm², and the thus-coated paper was then dried for 5 hours. The thus-coated paper was cut into pieces of 30 × 20 mm which were wetted with water to re-activate them, thereafter applied to the surface of substrates such as paper, canvas, lumber (such as lauan, Japanese cypress or birch), glass, aluminum and steel and then dried for two hours to obtain test pieces. It was then attempted to peel the test pieces of the adhesive-coated paper from the substrated by the use of human fingers, with the result that in each case the adhesive-coated paper was broken, thereby providing said aqueous solution to be successfully used as a re-wettable adhesive.

What is claimed is:

1. A water-soluble adhesive consisting essentially of an aqueous solution of a partly alkali metal modified butadienemaleic anhydride copolymer wherein the free carboxylic acid groups and the carboxylic acid-alkali metal salt groups are contained in ratios of from 9 : 1 to 2.5 : 7.5, respectively, the partly alkali metal-modified copolymer being prepared from a starting butadiene-maleic anhydridecopolymer wherein the butadiene and maleic anhydride units are on the main chain and at least one alkali metal compound.

2. A water-soluble adhesive according to claim 1, wherein the starting butadiene-maleic anhydride copolymer is the one having an intrinsic viscosity of 0.1–3.0 as determined in acetone at 30° C.

3. A water-soluble adhesive according to claim 1, wherein the alkali metal compound is a member selected from the group consisting of sodium, potassium and lithium hydroxides; sodium, potassium and lithium carbonates; and sodium and potassium bicarbonates.

4. A method of adhering two surfaces together comprising applying to at least one of the surfaces an adhesive according to claim 1, placing the surfaces in superposed relationship and permitting the adhesive to dry.

5. A process for the preparation of a water-soluble adhesive comprising a partly alkali metal-modified butadiene-maleic anhydride copolymer wherein the free carboxylic acid groups and the carboxylic acid-alkali metal salt groups are contained in ratios of from 9 : 1 to 2.5 : 7.5, comprising the steps of hydrolyzing a starting butadiene-maleic anhydride copolymer having an intrinsic viscosity of 0.1–3.0 as determined in acetone at 30° C and then reacting the thus-hydrolyzed copolymer with at least one alkali metal compound in such amounts as to correspond to 0.2–1.5 equivalent of the maleic anhydride residues in said starting copolymer, in a liquid phase at 20° –100° C for ½–5 hours.

6. A process according to claim 5, wherein the liquid phase is an aqueous liquid phase.